(12) United States Patent
Schutte et al.

(10) Patent No.: US 6,374,506 B1
(45) Date of Patent: Apr. 23, 2002

(54) SHAFT CENTERING TOOL FOR NUCLEAR REACTOR COOLANT PUMP MOTOR

(75) Inventors: David J. Schutte, Reedsville, WI (US); Ronald L. Warnock, Lake Jackson; Terry A. Brewer, Elmaton, both of TX (US)

(73) Assignee: STP Nuclear Operating Company, Wadsworth, TX (US)

( * ) Notice: Subject to any disclaimer, the term of this patent is extended or adjusted under 35 U.S.C. 154(b) by 146 days.

(21) Appl. No.: 09/595,080

(22) Filed: Jun. 16, 2000

(51) Int. Cl.[7] ................................................. B66F 3/08
(52) U.S. Cl. ......................................... 33/644; 254/100
(58) Field of Search .......................... 33/644, 412, 502, 33/517, 520, 529, 613, 655, 661; 257/98, 100; 73/66, 487

(56) References Cited

U.S. PATENT DOCUMENTS

| | | |
|---|---|---|
| 679,591 A | 7/1901 | Barns |
| 1,477,257 A | 12/1923 | Fritz |
| 2,553,571 A | 5/1951 | Frans |
| 2,821,788 A * | 2/1958 | Wendt ........................ 33/600 |
| 4,181,471 A | 1/1980 | Veronesi |
| 4,581,955 A | 4/1986 | Wentzell |
| 5,020,204 A * | 6/1991 | Desair ........................ 254/100 |
| 5,481,930 A | 1/1996 | Kuo |
| 5,796,262 A | 8/1998 | Bice |
| 5,971,362 A * | 10/1999 | Clark ........................ 254/100 |

FOREIGN PATENT DOCUMENTS

RU  1703955  10/1989

\* cited by examiner

Primary Examiner—Christopher W. Fulton
(74) Attorney, Agent, or Firm—Bracewell & Patterson L.L.P.

(57) ABSTRACT

An RCP pusher tool for use in maintenance of RCP motors wherein the tool utilizes a clamp assembly that fits over the existing bolts and nuts of the motor's lower bearing oil pan flanges, obviating the need for disassembly of the motor. The pusher tool is formed of two plates, each plate having holes disposed to fit externally over the bolt heads of the oil pan flanges. Disposed between the plates is a spacer block that maintains the plates in a spaced apart, parallel relationship. The spacer block also functions to support the pusher block itself. The spacer block has a threaded bore disposed for receipt of a pusher block positioning shaft. The threaded shaft has a motor shaft pusher block mounted to its distal end and is disposed to position the concave surface of the pusher block against the motor shaft. The two plates, when mounted over the bolts of the oil pan flange, are attached to one another by fasteners that can be adjusted with wing nuts to tighten the plates together over the bolt flanges. The pusher block can be adjusted into place against the motor shaft by means of the threaded positioning bolt. By avoiding the need to remove the oil pan bolts, the pusher tool can be installed quickly and easily without the need for prolonged exposure by maintenance personnel to the hazardous environment of a nuclear reactor cooling pump.

11 Claims, 4 Drawing Sheets

SHAFT CENTERING TOOL FOR NUCLEAR REACTOR COOLANT PUMP MOTOR

BACKGROUND OF INVENTION

1. Field of Invention

This invention generally pertains to reactor cooling pump motors used in nuclear power facilities, and more particularly to a device for centering the motor shaft of a reactor cooling pump.

2. Description of the Prior Art

In nuclear reactor systems well known in the art, the nuclear reactor produces heat energy often in excess of 500° F. which is transferred from the reactor core to steam generating equipment, such as heat exchangers, by a liquid phase reactor coolant that is circulated through the reactor core in a closed loop coolant system. Generally, the heat energy absorbed by the coolant is transferred by the heat exchanger to a second working fluid, resulting in a phase change of the second fluid from liquid to steam. Typically, to prevent the coolant in the closed loop from undergoing a similar phase change, the coolant is generally maintained at an extremely high pressure, well over 2000 psi, thus raising the phase change temperature of the coolant. In any event, the steam produced by the steam generating equipment is then used to generate electricity in a conventional manner.

As part of the above described process, a nuclear reactor coolant pump (RCP) is located in the cooling system and is used to circulate the reactor coolant between the reactor core and the steam generating equipment. Typically, each reactor will include four reactor coolant loops, with a separate reactor coolant pump and motor disposed in each loop.

RCPs are generally vertical type pumps with the motor mounted above the pump by means of a motor stand. The electric RCP motor has a vertical drive shaft that extends downwardly and is coupled with a vertical pump shaft extending up from the pump. As the RCP motor turns to drive the motor shaft, the motor shaft, being coupled to the pump shaft, drives the pump shaft which rotates the pump, thereby circulating the reactor coolant through the reactor system.

By way of example, a typical reactor coolant pump of the type described above includes an electric motor rated at about 8,000 Hp, 1,180 rpm, 13,500 V and having a high degree of cylindrical symmetry about the pump section. Such an RCP can pump over 100,000 gallons per minute through the coolant system. The vertical assembly stands approximately three stories high and is characterized by a pump bowl of approximately 6 feet in diameter and a motor of approximately 8 feet in diameter. The motor shaft itself is approximately 10 inches in diameter.

Commonly, the weight of the rotating elements of the RCP is carried by one of the motor bearings. The vertical shaft which connects the motor rotor to the pump is part of an assembly which includes the lower motor bearing and the pump seals. The pump seals are part of the primary system pressure boundary and must be maintained within the specified alignment parameters to minimize primary or reactor coolant system leakage. For this reason the motor drive shaft must be maintained in a "centered" position during operation. Shaft alignment for the pump seals and the motor drive shaft is maintained by the motor bearings. Any excessive play in the lower motor bearing, namely the radial bearing around the shaft at the lower end of the vertical motor, would jeopardize not only the motor, but also the pump and pump seal. If the pump seal fails, reactor coolant can leak from the primary system.

In any event, after a period of operation, it is generally necessary to perform routine maintenance on certain RCP motor components, including the motor shaft, pump seal and bearings, to ensure stringent alignment of all components at all times. During maintenance, each lower motor bearing is tested for wear which could result in radial movement of the motor shaft. If a bearing is worn excessively, it is replaced in order to limit such radial movement, thereby avoiding damage to the pump seal, pump and motor.

The process used to establish and maintain proper bearing and coupling alignment involves the use of shaft pushers to apply radial pressure to the motor shaft. Generally, four shaft pushers are temporarily mounted beneath the lower bearing oil pan at four positions around the shaft, 90 degrees apart. Each pusher can then be adjusted as needed to move or maintain shaft position as dictated by two specific maintenance functions.

First, pushers are used to test wear on the lower motor bearing. This bearing wear test or "swing check" is accomplished by applying radial pressure to the shaft at each compass point, thus pushing the shaft horizontally to its extreme so that deviation from the shaft centerline can be measured and used to determine bearing wear. Second, pushers are used to ensure axial alignment of the shaft during shaft coupling assembly. Only a well-aligned coupling will enable the motor and the pump to run for a full fuel cycle without excessive wear.

All of the above-described maintenance occurs when the pump is not in operation. However, maintenance on the RCP motor is often difficult because the area under the motor stand is approximately four feet in diameter and three feet in height. In addition to the limitations imposed by this physically small space, maintenance personnel must also be aware of other hazards that could inhibit or hamper maintenance to the motor, such as a relatively high radiation environment, rotating machinery and thermally hot metal parts.

Installation of the temporary pushers of the prior art required removal of a series of bolts along the joint flanges of the lower bearing oil pan. Bolt removal included removal of the lockwire used to secure the bolts. The lockwire was typically treated as radioactive waste and had to be properly disposed. Further, removal of these bolts often resulted in leakage of the radioactive oil contained in the pan. Since the maintenance personnel could only access this area from below, any leaking oil was likely to fall directly onto the personnel as they installed the temporary pushers. The flange bolts were then used to mount the temporary pushers to the oil pan flanges for the various maintenance activities. After use, the pushers were removed and the bolts were reinstalled, torqued and lockwired. Typically, installation and removal of prior art pusher tools required several hours of work by one to two maintenance personnel. More significantly, the procedure resulted in radioactive waste and exposed the maintenance personnel to the various hazards discussed above.

SUMMARY OF THE INVENTION

The present invention provides a pusher tool that utilizes a clamp assembly that fits over the existing bolts and nuts of the oil pan flanges without disassembly of the RCP motor. The clamp assembly supports a pusher that can be used in the standard fashion for maintenance activities.

The pusher tool is formed of two plates, each plate having holes disposed to fit externally over the bolt heads of the oil pan flanges. One of the plates has a spacer block through which a threaded positioning shaft is inserted. The threaded positioning shaft has a motor shaft pusher block mounted to its distal end. The two plates, when mounted over the bolts of the oil pan flanges, are attached to one another by fasteners that can be adjusted in position with wing nuts. This allows tightening of the plates together over the bolt flanges thereby clamping the tool to the flanges of the oil pan. The pusher block can then be adjusted into place against the motor shaft by means of the threaded positioning bolt.

The present invention, by forming a pusher block support clamp that fits over the bolts and flanges of the oil pan, overcomes the need for removing the bolts securing the oil pan flanges together. By avoiding such oil pan bolt removal, the pusher can be installed quickly and easily without the need for prolonged exposure by maintenance personnel to the hazardous environment of a nuclear reactor cooling pump.

DETAILED DESCRIPTION OF THE PREFERRED EMBODIMENTS

Figure 1:
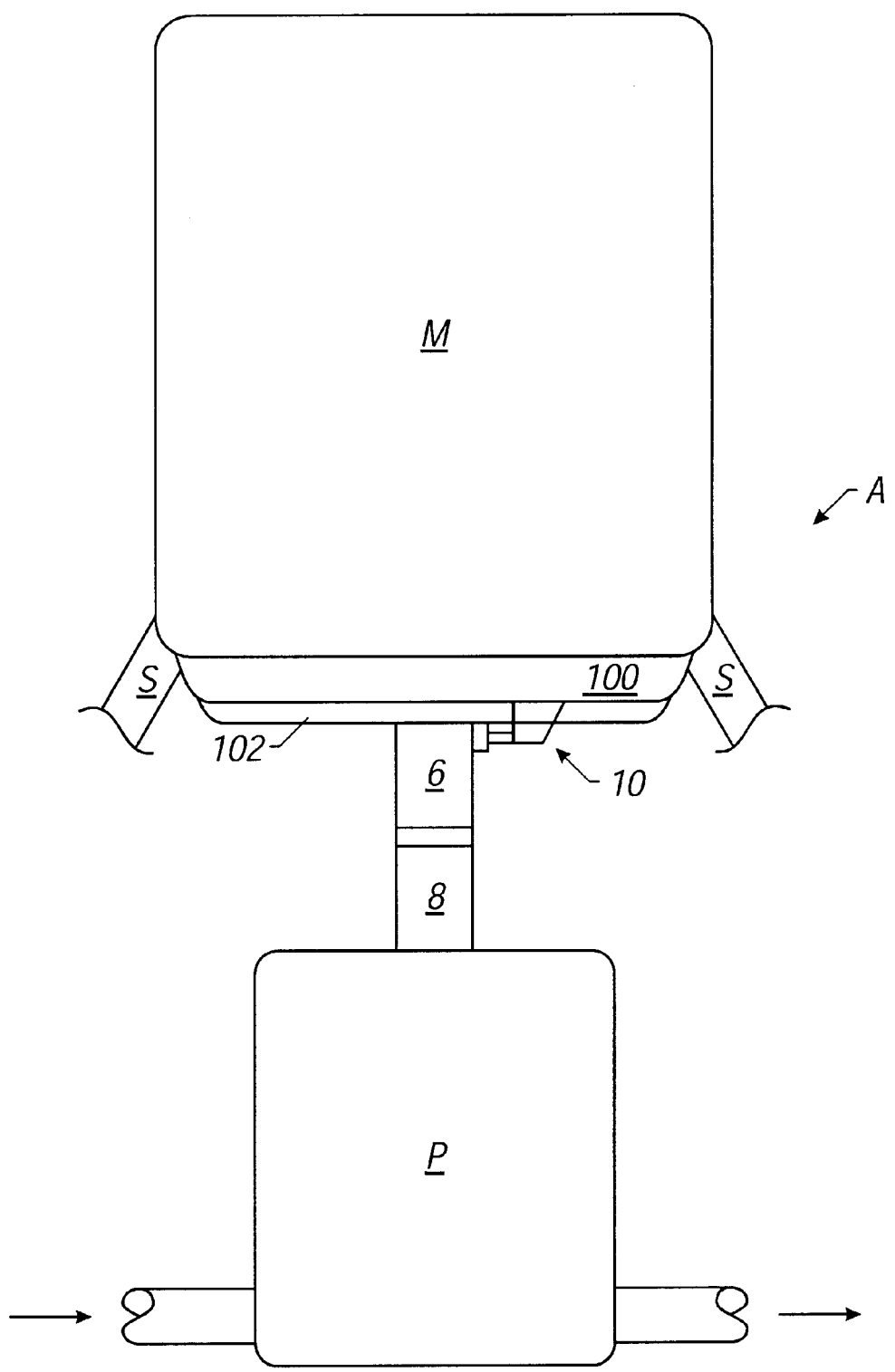
FIG. 1 is a side elevation view, partially schematic, of a nuclear reactor coolant pump reactor assembly or RCP.

FIG. 1 of the drawings illustrates schematically a reactor coolant pump assembly or RCP designated generally by the letter A. The RCP assembly A is of a conventional type and has a motor M mounted on a motor stand S vertically above a pump P. The motor M and pump P are coupled by a vertically connected motor shaft 6 and pump shaft 8.

A typical reactor coolant assembly A is typically thirty or more feet in height, the pump P had a borol approximately six feet in diameter, and the motor M is approximately eight feet in diameter. The motor shaft 6 for such an assembly has a diameter of almost a foot, usually about ten inches in diameter. The motor shaft 6 extends downwardly through a drip pan 100 below the motor M.

As is conventional, bearings within the motor M support the weight of the motor shaft 6 and pump shaft 8. The bearings of motor M, as well as shafts 6 and 8, are of an assembly which includes seals in pump P. Typically this structure is located within a relatively inaccessible position difficult of access and in an area comparatively smaller than can accommodate a worker. As has been set forth, the pump seals must be maintained in position within close mechanical tolerances for protection against possible leakage from the primary or reactor coolant system. It is thus important to periodically verify the vertical alignment of the shafts 6 and 8 to insure that the motor bearings do not allow unacceptable misalignment or deviation of the shafts 6 and 8 from their proper vertical axis. Such misalignment might jeopardize the integrity of coolant pump seals with attendant possible leakage of coolant fluid, which must be regarded as radiation contaminated.

With the present invention, a pusher tool assembly 10 (FIGS. 2,3, and 4) is provided which can easily be fitted beneath the drip pan 100 of the motor M. The pusher tool assembly 10 can then be used to test the relative movement of shafts 6 and 8 from their desired vertical axis.

Figure 2:
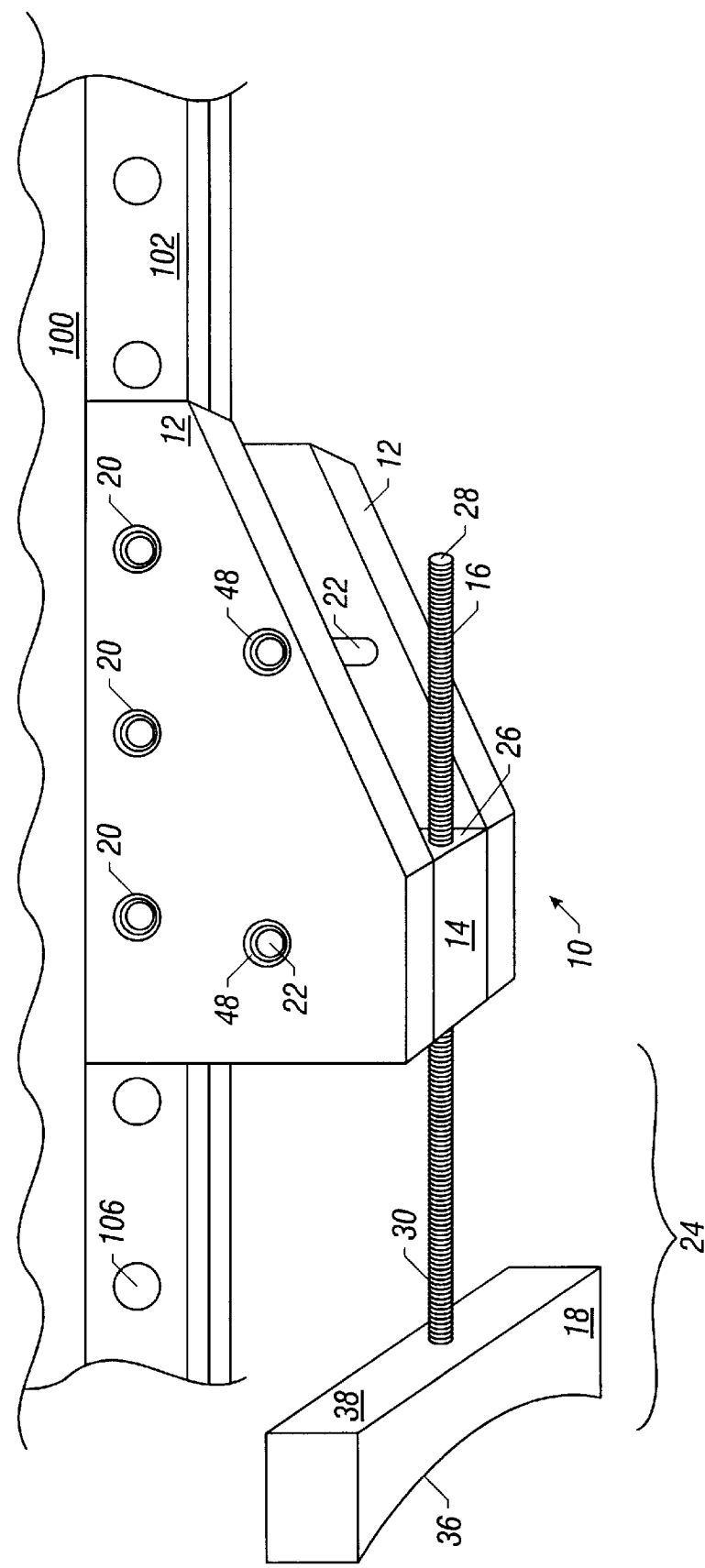
FIG. 2 is a side elevation view of a pusher assembly according to the present invention.
Figure 3:
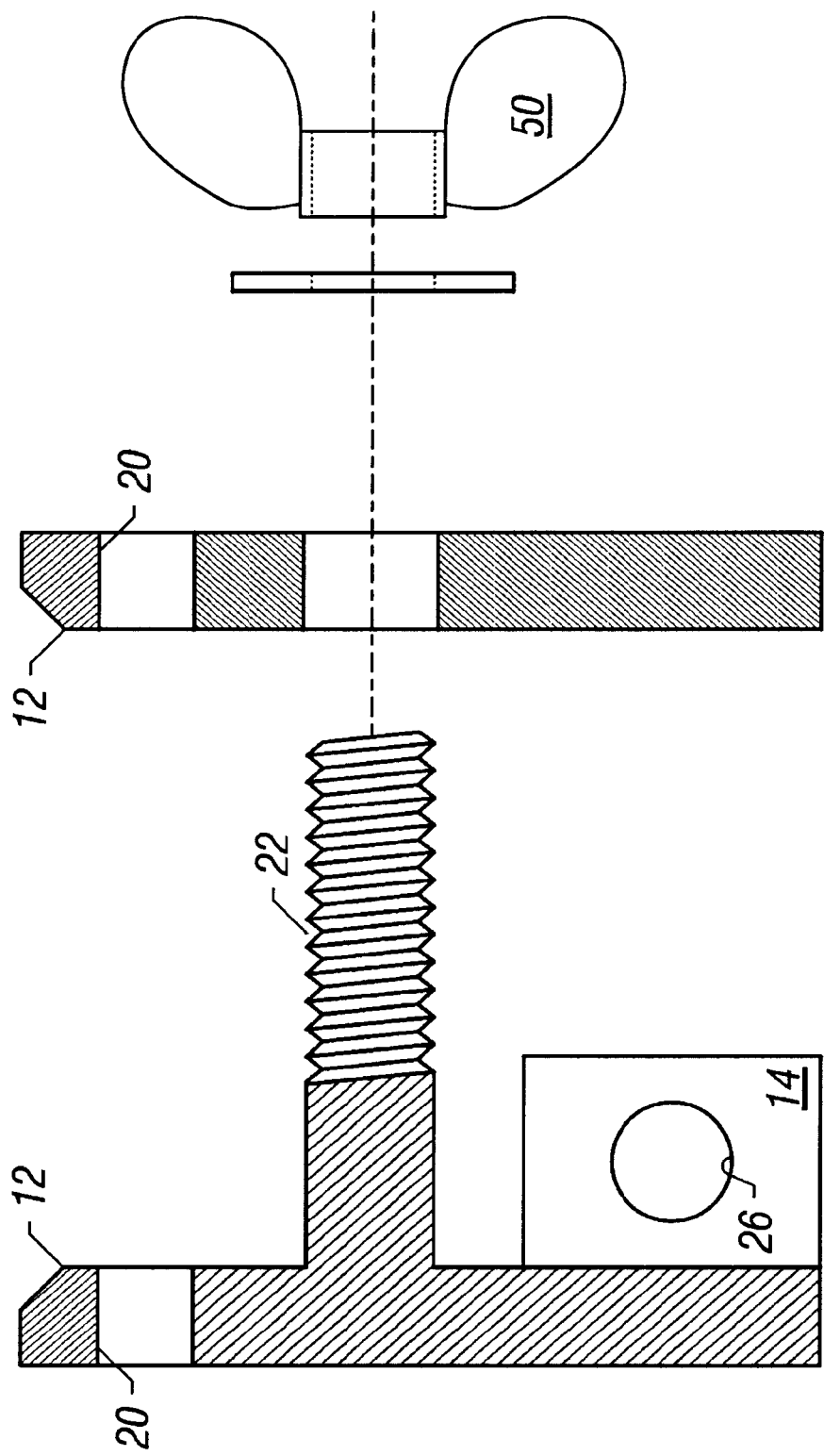
FIG. 3 is an exploded view, taken partly in cross-section, of a portion of the pusher assembly of FIG. 2.
Figure 4:
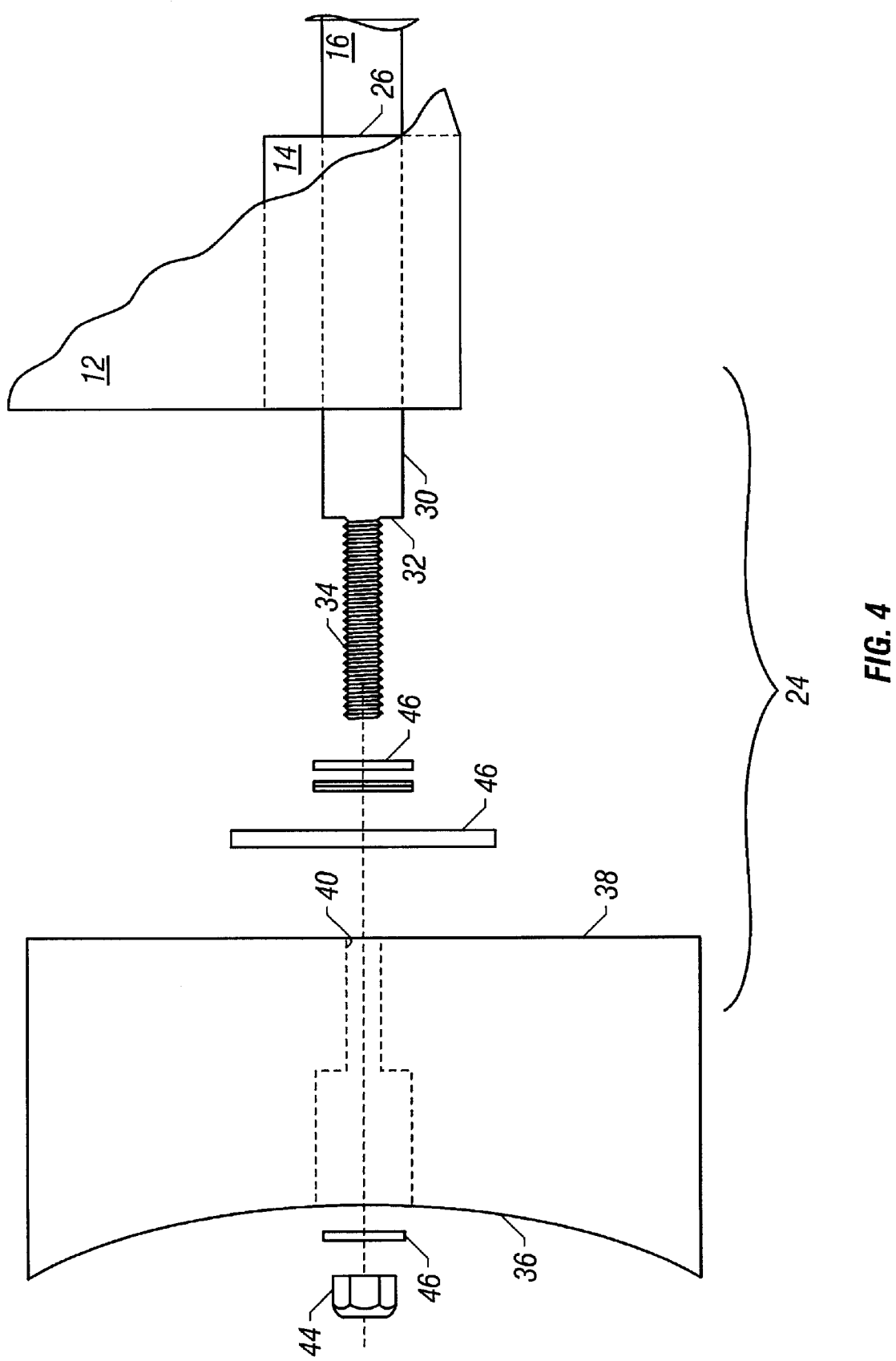
FIG. 4 is an exploded view of the pusher assembly of FIG. 2.

With reference to FIGS. 2, 3 and 4, a pusher tool assembly 10 according to the present invention is shown. Pusher tool assembly 10 generally includes first and second side plates 12, a spacer block 14, a pusher block adjustment shaft 16 and a pusher block 18. FIG. 1 illustrates pusher tool 10 attached to the lower side of the RCP motor oil drip pan 100. Drip pan 100 includes flanges 102 running along the seam of the drip pan 100. The adjacent flanges 102 are attached to one another utilizing fasteners 106 of the conventional type.

Each side plate 12 of tool assembly 10 is provided with a plurality of apertures 20 along its edge and is disposed to be positioned over flange 102 so that apertures 20 line up with and fit over fasteners 106, permitting plate 12 to fit flush against flange 102. As shown in FIG. 2, when each plate 12 is positioned against a flange 102 in this fashion, plates 12 extend downward from the flanges 102 in a substantially parallel relationship. Fasteners 22 extend between the adjacent parallel plates 12 and are used to secure plates 12 to one another. As fasteners 22 are tightened, the portions of each plate 12 that overlay flanges 102 function as a clamp around flanges 102, thereby securing pusher tool assembly 10 to drip pan 100.

Spacer block 14 is disposed between the two parallel plates 12 in order to space the lower portions of the plates away from one another. Those skilled in the art will understand that the width of spacer block 14 is preferably the same as the cumulative width of the two adjacent flanges 102 of oil pan 100, thereby permitting plates 12 to be maintained in a substantially parallel relationship when clamped onto flanges 102.

Spacer block 14 also supports the pusher subassembly 24 which is comprised of adjustment shaft 16 and pusher block 18. Specifically, spacer block 14 is provided with a threaded bore 26 that extends the length of spacer block 14. Bore 26 is disposed to threadingly engage adjustment shaft 16, such that when adjustment shaft 16 is rotated, it moves axially relative to spacer block 14 and plates 12. Shaft 16 is defined by a proximal end 28 and a distal end 30 and is threaded externally therebetween. At the distal end 30 of shaft 16, a shoulder 32 is defined from which axially extends a block attachment shaft 34.

Pusher block 18 is attached to distal end 30 of adjustment shaft 16, via block attachment shaft 34. Pusher block 18 is defined by a first side 36 and a second side 38. First side 36 is elliptically shaped to conform to the outer circumferential surface dimensions of the RCP motor shaft 6. A throughbore 40 is disposed between first side 36 and second side 38 to permit attachment of pusher block 18 to adjustment shaft 16. Specifically, the block attachment shaft 34 is inserted into throughbore 40 until shoulder 32 abuts second side 38 of block 18. Any standard fastener may be used to secure block 18 to shaft 16. In the preferred embodiment, a nut 44 is threadingly engaged .with the protruding end of block attachment shaft 34. Throughbore 40 may be countersunk so that fastener is disposed below the surface of first side 36. In addition, washers 46 may be utilized at the attachment surfaces of block 18. Preferably, pusher block 18 is attached to adjustment shaft 16 so that pusher block 18 can freely rotate about the end of block attachment shaft 34.

As shown in FIG. 3, in one preferred embodiment, fasteners 22 are integrally formed or fixed on one of the plates 12 and are disposed to be threaded through corresponding apertures 48 in the adjacent plate 12. Likewise, spacer block 14 may be integrally formed or fixed on a plate 12. Wing nuts 50 may be used to aid in installation and removal since they are more easily manipulated than other types of fasteners, a desirable feature due to the confined space under the RCP motor M.

While the preferred embodiment utilizes spacer block 14 to separate plates 12 from one another in their installed position over oil pan flanges 102, those skilled in the art will understand that the ability of the pusher block tool assembly 10 to clamp over the flanges is an improvement feature of the present invention. Therefore, a spacer device is not necessary to practice of the invention. Likewise, although a spacer block is used to support pusher assembly 24 in the preferred embodiment, pusher subassembly 24 can be mounted to the clamping plates in any standard fashion. Similarly, spacing mechanisms or structures other than a spacer block may be used to maintain the spacing of plates 12.

Because the pusher tool assembly 10 is not used during operation of the RCP, there is little or no restriction on the types of materials of construction for the plates, fasteners, adjustment shaft and spacer block of the invention. Preferably, these components are formed of a stainless steel to inhibit rust accumulation. The materials of construction for pusher block 18 are preferably materials that will not damage the motor shaft 6 during use of pusher tool assembly 10. Those skilled in the art will understand that such material should be softer than the motor shaft, which is typically steel, but of sufficient hardness to inhibit wear that could result in residue buildup on the motor shaft 6. Typically, the pusher blocks are formed of a synthetic resin of suitable strength and durability. Hardwoods would function satisfactorily, but may absorb moisture and become radioactive over time. More desirable are synthetic resins of the type known as poly or phenolic resins for pusher blocks. Phenolic or poly pusher blocks are easily cleaned and thus less likely to become radioactive as could hardwoods.

In operation, once the pusher tool 10 is secured to the oil pan flanges 102 in the manner described above, pusher block 18 can be made to bear against the RCP motor shaft by rotating adjustment shaft 16. Since pusher block 18 is secured to adjustment shaft 16 in a manner that permits free rotation of pusher block 18 relative to adjustment shaft 16, pusher block 18 can remain in alignment with the RCP motor shaft as adjustment shaft 16 is rotated within spacer block 14.

One advantage of the current invention is that it is externally mounted to the RCP motor M and requires no disassembly of the RCP motor, specifically the bearing oil pan 100, for either installation or removal of the pusher tool assembly 10. Thus many of the problems associated with disposal of radioactive lockwire and exposure to potentially radioactive oil are overcome.

Furthermore, the assembly 10 can quickly be manipulated and clamped onto the oil pan 100, a time saving feature. This is particularly desirable since a shortened installation time decreases exposure of maintenance personnel to the radioactive environment. In addition, the number of fasteners 22 required to secure the tool assembly 10 to the oil pan 100 are fewer in number than the prior art pushers. The fasteners 22 are also more accessible, a feature that is especially desirable in light of the confined work space under the oil pan 100.

Still yet another advantage of the invention is that no components or parts need be attached to the motor shaft minimizing the possibility of damage to the motor shaft. Finally, the tool has no electrical function or components, further enhancing its durability which is especially desirable in the harsh environments characteristic of nuclear power plants.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A pusher tool for testing movement of a motor shaft from its vertical axis, comprising:

first and second side plates spaced apart from one another in a substantially parallel relationship;

at least one aperture in each side plate substantially aligned with one another;

a fastener extending between said side plates;

a pusher block support attached to at least one side plate;

an adjustment shaft threadingly engaged to said pusher block support; and a pusher block attached to said adjustment shaft.

2. The pusher tool of claim 1 wherein said pusher block support is a spacer block mounted between said first and second side plates.

3. The pusher tool of claim 2 wherein said spacer block is provided with a threaded bore extending therethrough and said adjustment shaft is engaged by said threaded bore.

4. The pusher tool of claim 1 wherein said pusher block is rotatingly attached to said adjustment shaft.

5. The pusher tool of claim 1 wherein said pusher block is formed from a phenolic synthetic resin.

6. The pusher tool of claim 1 wherein at least one surface of said pusher block is shaped.

7. The pusher tool of claim 6 wherein said shaped surface is concave to conform to the surface of the motor shaft.

8. The pusher tool of claim 1 wherein said fastener comprises a threaded bolt and wing nut, wherein said threaded bolt extends from the first clamping plate and protrudes through a bolt hole provided in said second side plate and said protruding bolt is threadingly engaged by said wing nut.

9. A motor shaft centering tool comprising:

a first elongated plate, said first plate having a top edge and a bottom edge, wherein at least two apertures are defined in said first plate along said top edge;

a second elongated plate, said second plate having a top edge and a bottom edge, wherein at least two apertures are defined in said first plate along said top edge;

said first plate spaced apart from said second plate so that said top edges and bottom edges are substantially aligned and said plates are substantially parallel with one another whereby said apertures are adjacent one another, said spaced apart plates defining a distance there between;

a fastener extending between said first and second plates, wherein said fastener can be adjusted to move said plates relative to one another thereby altering the distance between said plates;

a spacer block attached to said first plate adjacent said bottom edge, said spacer block extending toward said second plate, wherein said spacer block is provided with a threaded bore extending therethrough in longitudinal parallel relationship with said first and second plates;

a threaded adjustment shaft mounted in said threaded bore of said spacer block, said adjustment shaft having a proximal end and a distal end, wherein rotation of said shaft results in axial movement of said shaft substantially parallel with said top edges of said elongated plates; and an elongated pusher block rotatingly mounted on the distal end of said adjustment shaft, said pusher block defined by a first elongated surface and a second elongated surface, wherein said adjustment shaft attaches to said pusher block perpendicular to said first elongated surface and said second elongated surface is concave in shape.

10. The centering tool of claim 9 wherein said pusher block is formed from a phenolic synthetic resin.

11. A tool assembly for testing movement of a motor shaft of a motor in a reactor cooler pump assembly of a nuclear reactor, comprising:

first and second side plates spaced apart from one another in a substantially parallel relationship;

at least one aperture in each side plate substantially aligned with one another;

a fastener extending between said side plates;

a pusher block support attached to at least one side plate;

an adjustment shaft threadingly engaged to said pusher block support; and a pusher block attached to said adjustment shaft.

* * * * *